US011362446B2

(12) United States Patent
Cochrane

(10) Patent No.: US 11,362,446 B2
(45) Date of Patent: Jun. 14, 2022

(54) EARTHING TECHNIQUE

(71) Applicant: COCHRANE STEEL PRODUCTS (PTY) LTD, Kempton Park (ZA)

(72) Inventor: Richard Bruce Cochrane, Kempton Park (ZA)

(73) Assignee: COCHRANE STEEL PRODUCTS (PTY) LTD, Kempton Park (ZA)

( * ) Notice: Subject to any disclaimer, the term of this patent is extended or adjusted under 35 U.S.C. 154(b) by 459 days.

(21) Appl. No.: 15/976,259

(22) Filed: May 10, 2018

(65) Prior Publication Data

US 2019/0051996 A1 Feb. 14, 2019

(30) Foreign Application Priority Data

Aug. 8, 2017 (ZA) ................................ 2017/05613

(51) Int. Cl.

*E04H 17/16* (2006.01)
*H01R 4/66* (2006.01)
*A01K 3/00* (2006.01)
*E04H 17/00* (2006.01)
*H01R 4/44* (2006.01)

(52) U.S. Cl.

CPC ............... *H01R 4/66* (2013.01); *A01K 3/005* (2013.01); *E04H 17/017* (2021.01); *E04H 17/161* (2013.01); *H01R 4/44* (2013.01)

(58) Field of Classification Search

CPC . H01R 4/66; H01R 4/44; A01K 3/005; A01K 3/00; A01K 3/002; A01K 2003/007; E04H 17/02; E04H 17/06; E04H 17/18; E04H 17/24; E04H 17/161; E04H 17/017; H01B 5/008

USPC ........................ 256/10, 55; 439/92, 444, 927

See application file for complete search history.

(56) References Cited

U.S. PATENT DOCUMENTS

| | | | | | |
|---|---|---|---|---|---|
| 2,372,653 | A * | 4/1945 | Becket | H01R 4/2479 | 439/412 |
| 4,023,882 | A * | 5/1977 | Pettersson | H01R 4/26 | 439/426 |
| 4,154,429 | A * | 5/1979 | Brannan | H05F 3/02 | 109/35 |
| 4,154,430 | A * | 5/1979 | Pfarr, Jr. | H05F 3/02 | 109/35 |
| 4,496,791 | A * | 1/1985 | Reichert | H01H 9/12 | 174/51 |
| 4,723,761 | A * | 2/1988 | Cluff | E04H 17/066 | 256/32 |
| 7,997,560 | B2 * | 8/2011 | Bergdoll | E04H 17/066 | 256/24 |
| 8,070,404 | B1 * | 12/2011 | Schluter | F16B 41/002 | 411/368 |
| 8,327,565 | B2 * | 12/2012 | Boltz | G09F 15/0025 | 40/603 |
| 9,520,657 | B2 * | 12/2016 | Lawson | H01R 4/34 | |
| 9,695,613 | B2 * | 7/2017 | Shepherd | E04H 17/161 | |
| 2008/0217596 | A1 * | 9/2008 | Dolan | E04H 17/16 | 256/1 |
| 2016/0036141 | A1 * | 2/2016 | Lawson | H01R 4/20 | 439/784 |

* cited by examiner

*Primary Examiner* — Michael P Ferguson
*Assistant Examiner* — Kevin J Baynes
(74) *Attorney, Agent, or Firm* — Tutunjian & Bitetto, P.C.

(57) ABSTRACT

An earth connector for a fence panel includes a member with a sharp edge which penetrates protective material on rods of the panel to come into electrical contact with at least two of the rods.

7 Claims, 5 Drawing Sheets

EARTHING TECHNIQUE

BACKGROUND

This invention relates to the electrical earthing or grounding of fencing or barrier material.

One type of fence which is in widespread use is erected from a plurality of mesh panels with each panel being positioned between and connected to an adjacent pair of spaced-apart support poles. Generally, this type of fence does not require any electrical earthing. However, if the fence is erected at an electrical plant such as an electrical sub-station, near a potentially explosive environment such as an oil or petroleum farm, or close to high voltage power lines, then care must be taken to ensure that any electrical factor on the fence which could cause harm is addressed. For example, static or induction effects can cause an electrical charge to be accumulated on the fence. Another possibility is an accidental contact of an electrical conductor or cable with the fence. Thus the fence must be electrically earthed so that if these events do occur the likelihood of harm is substantially reduced or eliminated.

An object of the present invention is to provide an earthing technique which, at least to some extent, addresses the aforementioned requirement.

SUMMARY

The invention provides an earth connector for use with a fence panel which includes a plurality of rods which are interconnected in a mesh configuration, the earth connector including at least one conductive member which is in electrical contact with at least two of the rods, and at least one fastener which is fixed to and which is in electrical contact with the at least one conductive member and which is configured to be electrically connected to at least one earthing conductor.

The conductive member may be fixed to the rods in any appropriate way. For example, the conductive member may be clamped to the rods and, for this purpose, the conductive member may be one of a pair of plates which are positioned on respective opposing sides of the rods and which are then clamped together. Alternatively or additionally, the conductive member is welded to the rods.

In some panels the rods are pre-coated with a protective material to resist the effects of corrosion and the like. In order to enhance the electrical contact between the conductive member and the rods, the protective material may be removed, as necessary, before the conductive member is fixed in position. As an alternative the conductive member is connected to the rods when they are bare, ie. not coated, and coating takes place thereafter, possibly covering at least a part of the conductive member.

In another form of the invention the conductive member is shaped, e.g. with a sharp edge, so as to penetrate a layer of a pre-applied protective material. In this way the conductive member is brought directly into electrical contact with one or more of the metallic rods which, typically, are in a mesh configuration which provides an effective deterrent and security function.

With this form of the invention the conductive member may for example have the shape of a dome or a cup, with a leading edge or rim which can penetrate the protective layer. Preferably two of the conductive members are used, located respectively on opposing sides of the fence panel. A suitable device, e.g. a bolt which is passed through registering formations, e.g. holes, in or on the conductive members, is then used to draw the conductive members towards each other. In the process the conductive members are secured to the fence panel, in sound electrical contact with the rods.

In one application the fence panel is covered, at least partly, with a metallic sheet material for security purposes. The sheet material should also be earthed. Preferably this function is simultaneously achieved by ensuring that the conductive member is electrically and mechanically engaged with the sheet material, for example by means of an appropriate fastener or fasteners. Alternatively or additionally the sheet material is directly electrically and mechanically fixed to the rods in the fence panel.

The fastener may be of any appropriate kind and preferably is in the form of a stud which projects through or from the conductive member or members. The fastener, itself, may be fixed in a permanent manner to the conductive member, e.g. by welding. Alternatively, the fastener may pass through a hole in the conductive member and may be fixed securely to the conductive member, in electrical contact therewith, by means of a nut which is engaged with a threaded shank on the fastener.

The earthing conductor may be an earth strap or any other conductive element which is normally made from copper or aluminium and which may be flexible at least to some extent. The earthing conductor may be terminated in a lug or similar component and the fastener may be dimensioned and shaped to engage securely with the lug. The earth conductor may be connected directly to an earth spike or an earth mat in the ground.

BRIEF DESCRIPTION OF THE DRAWINGS

The invention is further described by way of examples with reference to the accompanying drawings in which.

DESCRIPTION OF PREFERRED EMBODIMENTS

Figure 1A:
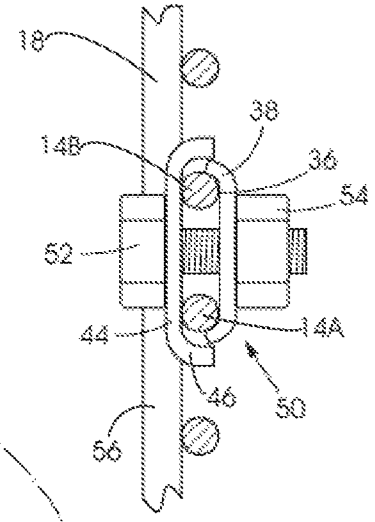
FIG. 1A shows the mesh panel portion in cross section taken on a line A-A in FIG. 1.
Figure 1:
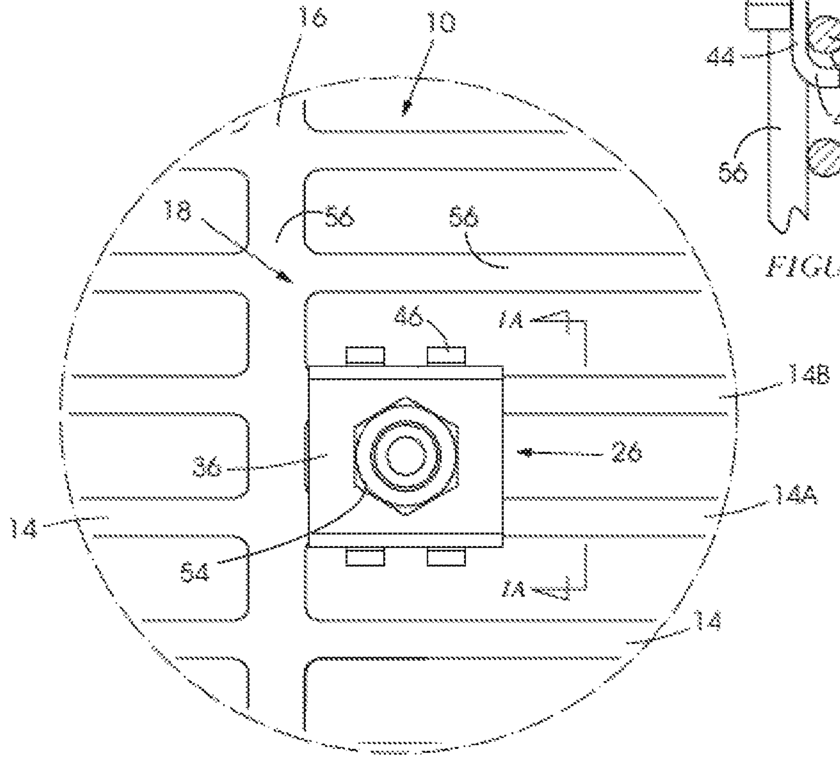
FIG. 1 illustrates a portion of a mesh panel which includes an earth connector according to the invention.

FIG. 1 and FIG. 1A of the accompanying drawings illustrate a portion of a mesh panel 10 which forms a part of a fence.

In this instance the mesh panel 10 includes a plurality of spaced apart and parallel rods 14 which are welded to transversely extending rods 16 at respective points of contact 18. Adjacent pairs of rods 16 are spaced apart by a distance 20 (see FIG. 2) which is substantially greater than the spacing 22 between each adjacent pair of rods 14.

Secured to a pair of rods 14A and 14B, at a suitable location, is an earth connector 26 according to the invention. The connector 26 includes a first plate (conductive member) 36 which bridges a gap between the rods 14A and 14B. The plate 36 has curved flanges 38 which overlie sections of the rods 14A and 14B so that sections of the plate can bear firmly against these rods thereby to establish a sound electrical contact between the rods 14A and 14B and the plate 36.

The plate 36 is on one side of the mesh panel 10. The connector 26 includes a second plate (conductive member) 44 which is on an opposing, rear side of the panel 10 and which is not fully visible. The plate 44 has hook formations 46 which wrap around sides of the curved flanges 38. The plate 44 is also in firm electrical contact with sections of the rods 14A and 14B. A fastener 50, which includes a bolt 52 and a nut 54, is used to fix the plates together. The bolt 52 passes through registering holes in the plates 36 and 44. The nut 54, which is engaged with a protruding threaded end of the bolt, is tightened so that the plates 36 and 44 are clamped together and are kept in firm electrical contact with the rods 14A and 14B. The construction is shown from one side and in cross section in FIG. 1A.

The plates 36 and 44 are fixed in position before the rods are coated with a corrosion-resistant material 56. Thus the rods and the plates are covered at the same time with the protective material.

In FIG. 1 the plate 36 is shown exposed, ie. not covered. This has been done to illustrate the true nature of the earth connector 26. In order to make an earth connection to the connector 26 the nut 54 is loosened and a lug (not shown) which is connected to an earth strap is then engaged with the bolt 52. The nut 54 is then replaced and tightened to establish a firm electrical contact between the lug and the plate 36. This aspect is shown in further detail in the alternative embodiment illustrated in FIG. 2.

Figure 2:
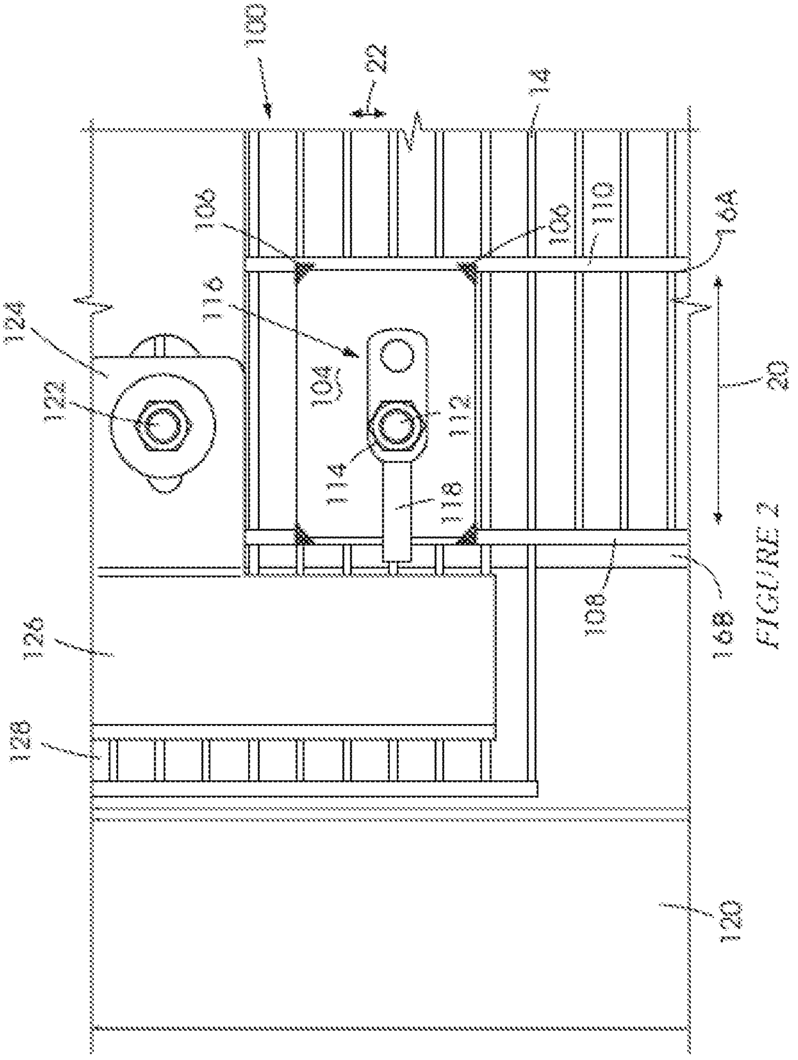
FIG. 2 shows an earth connector according to a second form of the invention.

FIG. 2 shows a portion of a mesh panel 100 which, in contrast to the panel shown in FIG. 1, is not coated with a protective material. An earth plate 104 is fixed to an opposing side of the mesh panel 100 and is welded at four corners 106 to corresponding locations on an adjacent pair of rods 16A and 16B. A stud 112 protrudes from the plate 104. The stud 112 is welded to the plate 104 or is passed through a slot in the plate 104. The stud 112 is clamped in position through the use of a nut 114 which is threadedly engaged with a protruding threaded end of the stud. A copper lug 116 is electrically and mechanically fixed to the stud 112. The stud 112 has a ferrule 118 which is crimped around an end of an earthing conductor, not shown.

The mesh panel 100 is attached to a support post 120 by means of a fastening arrangement which includes bolts 122 which act against a bearing plate 124 and a fitting plate 126 thereby to secure a flange 128 of the mesh panel to the post 120. Thus the post 120 is in electrical contact with the mesh panel 100.

Figure 3:
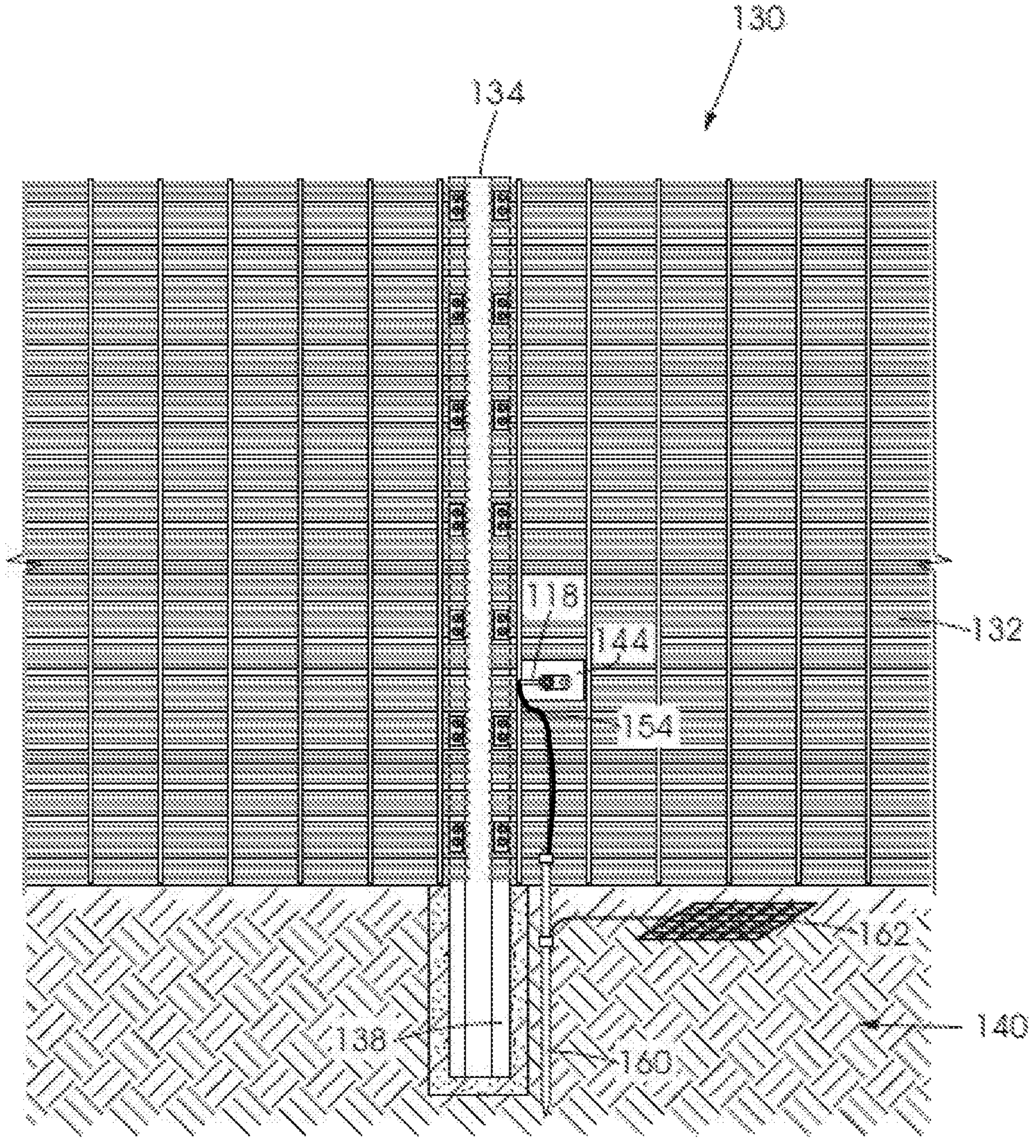
FIG. 3 is a representation of a fence panel earthed in accordance with the principles of the invention.

FIG. 3 shows a portion 130 of a fence which includes a mesh panel 132, generally of the kind described, located between and fixed to an adjacent pair of posts 134. Only one post 134 is shown. Lower ends 138 of the posts are embedded in the ground 140. An earth connector 144, of the kind shown in FIG. 1 or in FIG. 2, is fixed to the mesh panel 132. An earth connection can be made to each post 134 by using an appropriate earth strap or, if the fence arrangement has the construction shown in FIG. 2, this connection is established once respective flanges on the panel are fixed to the posts.

The ferrule 118 is crimped to an end of an earth strap 154 which leads to an earth spike 160 which is embedded in the ground in accordance with prescribed electrical specifications. Alternatively the strap is connected to an earth mat 162 which is embedded in the ground.

The earth arrangement of the invention is readily usable with a fence which is made from mesh panels of the kind described. Ideally each panel should be separately earthed, particularly in a potentially high risk location. As the rods in each panel are conductive and are electrically connected to one another by means of a welding process which is used in the fabrication of the panel, it is cost-expedient to position the earth conductor as low as is practical on a mesh panel so that the length of the earth conductor to the earth spike or earth mat is minimized.

Figure 4:
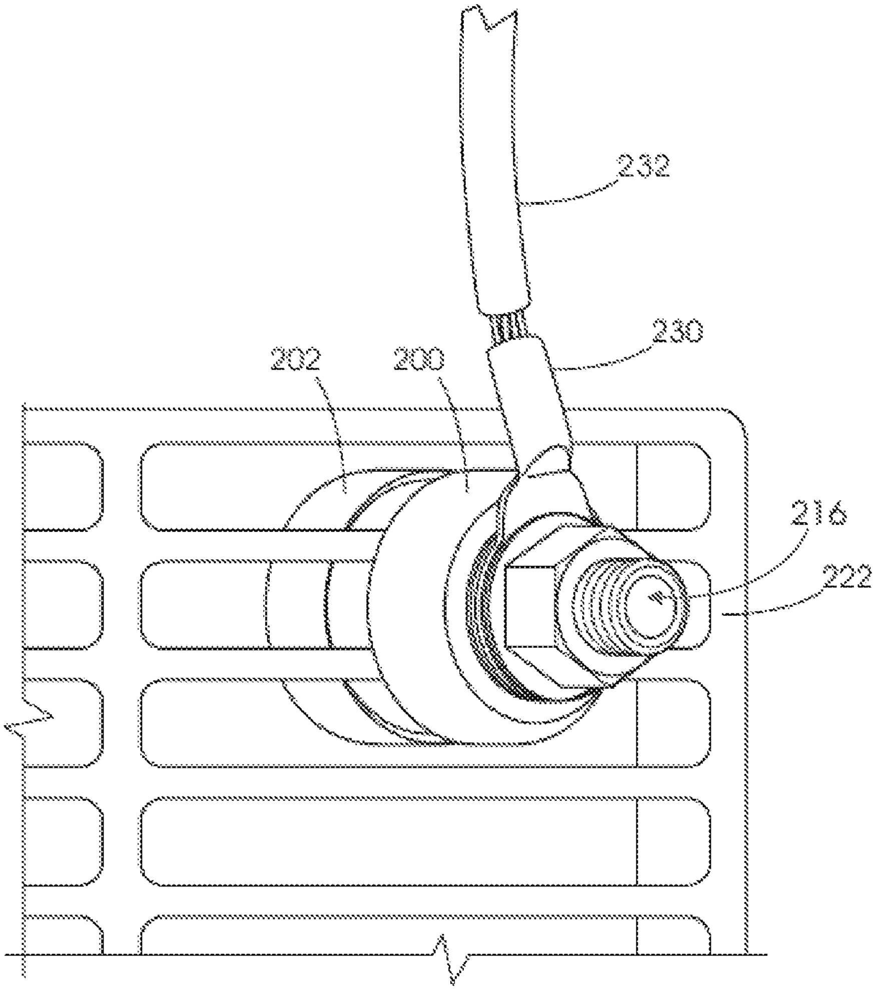
FIG. 4 shows the use of two cup-shaped conductive members in a different form of the invention.
Figure 5:
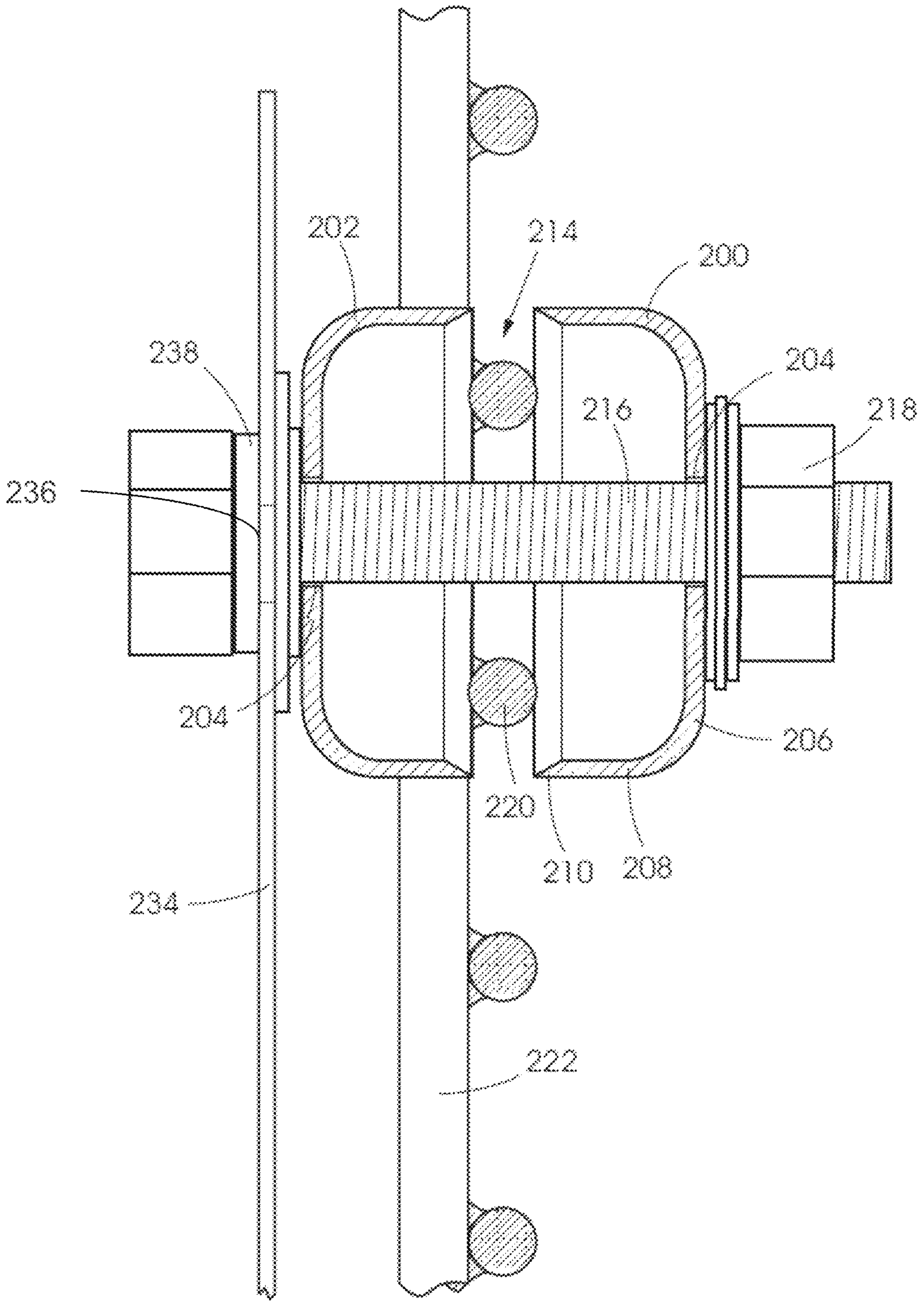
FIG. 5 shows in cross section and from one side two cup-shaped conductive members which are used to establish an electric connection to a fence panel, formed from coated metal rods, to which protective sheet metal or cladding is secured.

FIGS. 4 and 5 show the use of two cup-shaped conductive metallic members 200 and 202 in an alternative form of the invention. The member 200 has a central hole 204 in a base 206 of the member. A side wall 208 has a rim or edge which has a chisel shape 210. The member 202 is identical to the member 200.

The members 200 and 202 are positioned on opposing sides of a fence panel 214. A bolt 216 which is passed through the holes 204, of the members, which are in register, is used, by tightening a nut 218, engaged with the bolt, to urge the members towards each other, into tight contact with intervening rods 220 of the fence panel. A protective coating 222 on the rods is thereby penetrated by the chisel edges 210 of the members which are then in electrical contact with the metallic rods.

A lug 230 with an earth cable 232 is fixed to the bolt 216. If the fence panel is covered with metallic steel cladding 234 (see FIG. 5) then the bolt 216 is also electrically connected to the cladding 234 by passing the bolt through a hole 236 in the cladding before engaging the bolt with the cap-shaped members 200 and 202.

A washer 238 engaged with the bolt 216 ensures a sound electrical and mechanical fixing of the bolt 216 to the cladding 234.

What is claimed is:

1. A combination of an earth connector and a fence panel having a plurality of spaced apart and parallel metallic rods which are welded to transversely extending metallic rods at respective points of contact to form a mesh configuration, the earth connector comprising:

at least a first and a second cup-shaped conductive member in direct electrical contact with at least two of the metallic rods, each positioned on opposed respective sides of the fence panel and which are fixed to the fence panel and to each other via at least one fastener fixed to and in electrical contact with the at least first and second cup-shaped conductive members and configured to be electrically connected to at least one earthing conductor, the first and second cup-shape conductive members having a base and a side wall extending from the base and forming a cavity within the cup-shape, the side wall having a circumferential chisel-shaped rim or edge which is spaced from the base wherein each cup-shaped conductive member penetrates a protective coating at two spaced apart locations on each of the at least two metallic rods, and each base of said conductive member being spaced from said two metallic rods.

2. The combination according to claim 1, further comprising a stud which projects through or from the first and second cup-shaped conductive members and to which an earth strap is connected.

3. The combination according to claim 1, wherein the first and second cup-shaped conductive members are in electrical engagement with metallic cladding which is applied to the fence panel.

4. A fence comprising:

at least two spaced apart fence posts, a fence panel which is fixed to the fence posts, the fence panel including a plurality of spaced apart and parallel metallic rods which are welded to transversely extending rods at respective points of contact to form a mesh configuration and which are coated with a protective material, two earth connectors in direct electrical engagement with at least two of the metallic rods, positioned on respective opposing sides of the fence panel and clamped together and onto the fence panel, the earth connectors having a cup-shaped conductive member having a base and side walls extending from the base and forming a cavity within the cup-shape, the side wall having a circumferential chisel-shaped rim or edge that penetrates said protective coating at two spaced apart location on the same two metallic rods and each said base is spaced from said two metallic rods, an earthing element in the ground, and an earth strap connecting the two earth connectors to the earthing element.

5. The fence according to claim 4, further comprising metallic cladding which is fixed to the fence panel and wherein the two earth connectors are electrically connected to the cladding.

6. An earth connector used with a fence panel having a plurality of spaced apart and parallel metallic rods which are welded to transversely extending metallic rods at respective points of contact to form a mesh configuration, the earth connector comprising:

a first cup-shaped conductive member having a base, side walls extending from the base and a circumferential chisel-shaped rim or edge spaced from the base, the first cup-shaped conductive member having a diameter large enough to enable the chisel-shaped rim or edge to penetrate a protective coating of at least two adjacent metallic rods such that the first cup shaped conductive member is in direct electrical contact with the at least two adjacent metallic rods;

a second conductive member positioned on an opposite side of the fence panel from the first cup-shaped conductive member, wherein the second conductive member comprises a second cup-shaped conductive member having a base, side walls extending from the base and a circumferential chisel-shaped rim or edge spaced from the base; and at least one fastener configured to pass through an aperture in the base of the first cup-shaped conductive member and attach to the second conductive member such that the at least one fastener is in electrical contact with the both the first cup-shaped conductive member and the second conductive member, the at least one fastener being configured to be electrically connected to at least one earthing conductor.

7. An earth connector used with a fence panel having a plurality of spaced apart and parallel metallic rods which are welded to transversely extending metallic rods at respective points of contact to form a mesh configuration, the earth connector comprising:

a first cup-shaped conductive member having a base, side walls extending from the base and a circumferential chisel-shaped rim or edge spaced from the base, the first cup-shaped conductive member having a diameter large enough to enable the chisel-shaped rim or edge to penetrate a protective coating of at least two adjacent metallic rods such that the first cup shaped conductive member is in direct electrical contact with the at least two adjacent metallic rods;

a second conductive member positioned on an opposite side of the fence panel from the first cup-shaped conductive member, wherein the second conductive member comprises a second cup-shaped conductive member having a base, side walls extending from the base and a circumferential chisel-shaped rim or edge spaced from the base, the second cup-shaped conductive member having a diameter large enough to enable the chisel-shaped rim or edge to penetrate a protective coating of the at least two adjacent metallic rods penetrated by the first cup-shaped conductive member such that the second cup shaped conductive member is in direct electrical contact with the at least two adjacent metallic rods; and at least one fastener configured to pass through an aperture in the base of the first cup-shaped conductive member and attach to the second conductive member such that the at least one fastener is in electrical contact with the both the first cup-shaped conductive member and the second conductive member, the at least one fastener being configured to be electrically connected to at least one earthing conductor.

* * * * *